Figure 1:
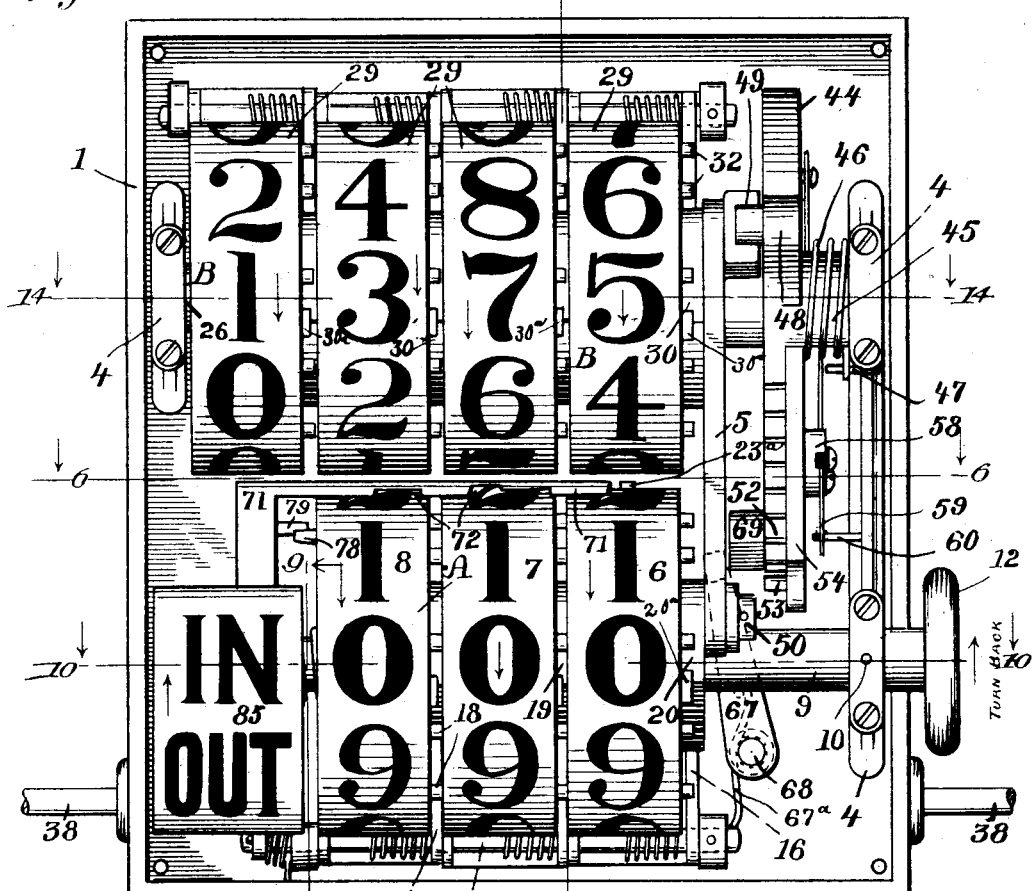

(No Model.) 7 Sheets—Sheet 1.

F. MARGGRAFF & C. LEISRING.
FARE REGISTER.

No. 539,816. Patented May 28, 1895.

WITNESSES:
John Drahn
Wm. T. Mackey

INVENTORS
FREDERICK MARGGRAFF
AND CHARLES LEISRING
BY
C. M. Newman
ATTORNEY

THE NORRIS PETERS CO., PHOTO-LITHO., WASHINGTON, D. C.

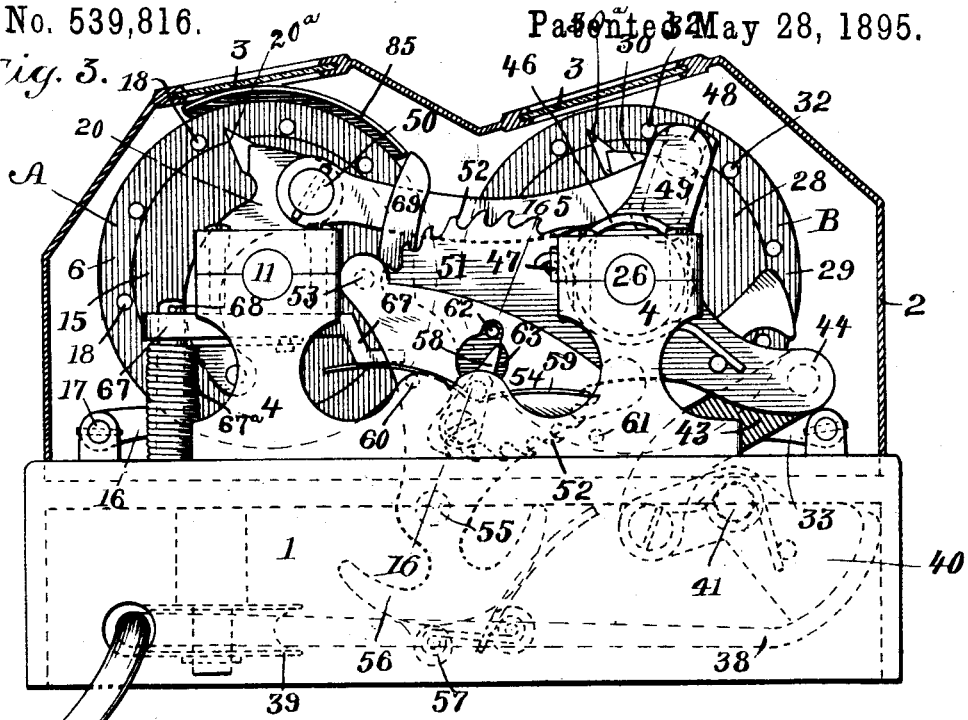

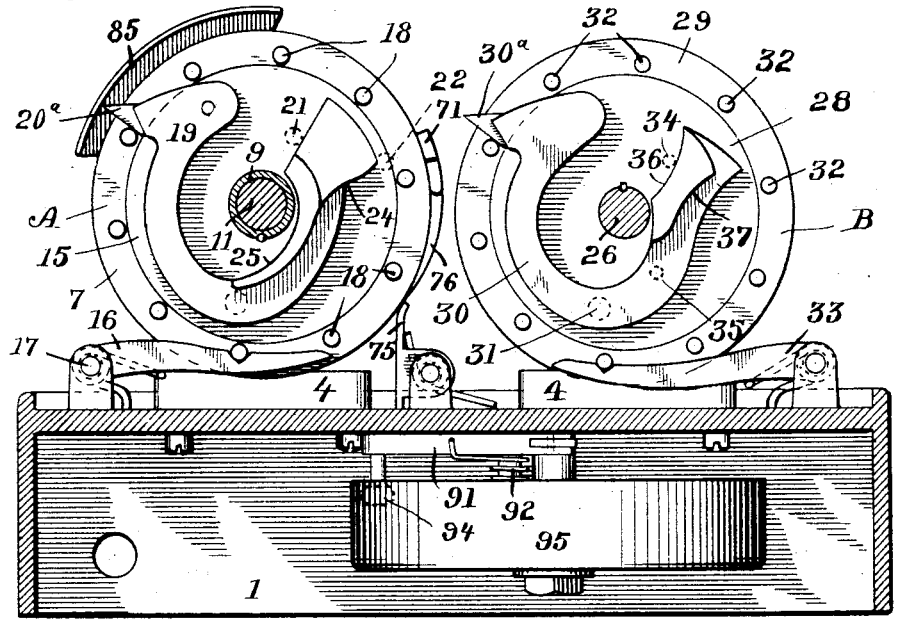

(No Model.) 7 Sheets—Sheet 4.
F. MARGGRAFF & C. LEISRING.
FARE REGISTER.
No. 539,816. Patented May 28, 1895.
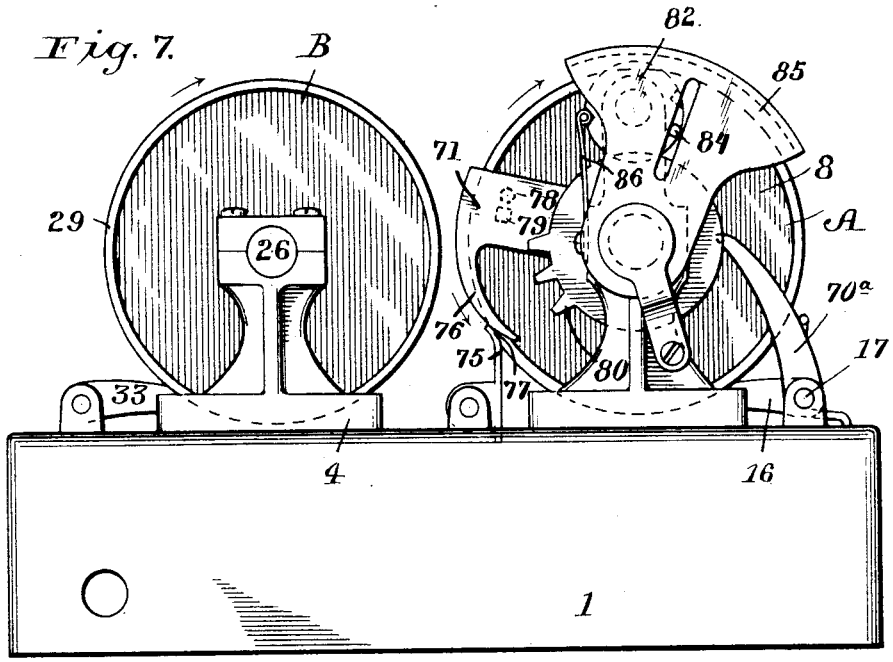
Fig. 7.
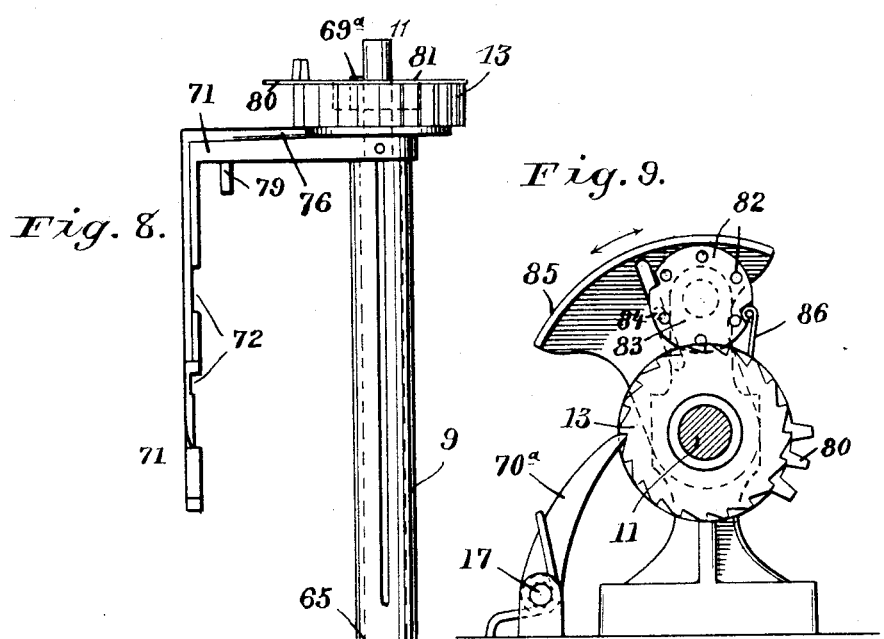
Fig. 8.
Fig. 9.
WITNESSES:
John Draher
INVENTORS
FREDERICK MARGGRAFF
AND CHARLES LEISRING
BY
C. M. Newman
ATTORNEY (No Model.) 7 Sheets—Sheet 5.
F. MARGGRAFF & C. LEISRING.
FARE REGISTER.
No. 539,816. Patented May 28, 1895.
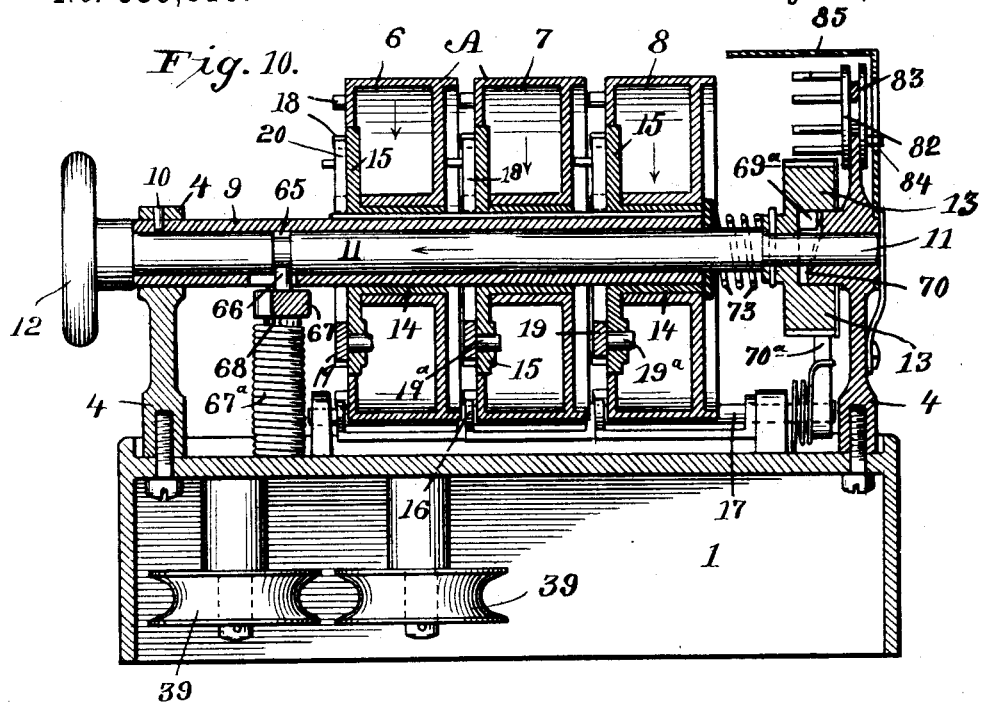
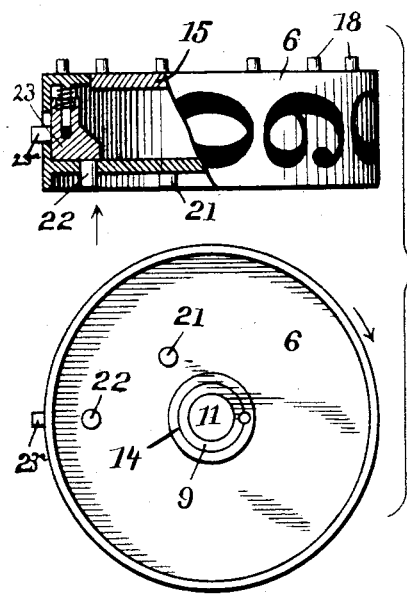
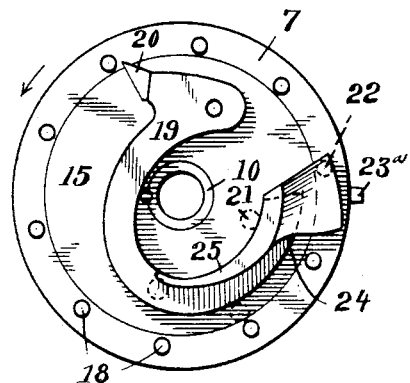
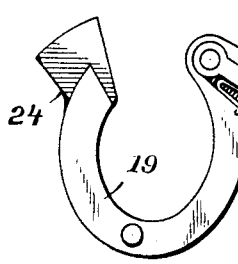
WITNESSES:
John Draher
Wm T. Macauley
INVENTORS
FREDERICK MARGGRAFF
AND CHARLES LEISRING
BY
C. M. Newman
ATTORNEY (No Model.) 7 Sheets—Sheet 6.

F. MARGGRAFF & C. LEISRING.
FARE REGISTER.

No. 539,816. Patented May 28, 1895.

WITNESSES:
John Draher

INVENTORS
FREDERICK MARGGRAFF
AND CHARLES LEISRING
BY
C. M. Newman
ATTORNEY (No Model.) 7 Sheets—Sheet 7.

F. MARGGRAFF & C. LEISRING.
FARE REGISTER.

No. 539,816. Patented May 28, 1895.

WITNESSES:
John Draher

INVENTORS
Frederick Marggraff
and Charles Leisring
BY
C. M. Newman
ATTORNEY

UNITED STATES PATENT OFFICE.

FREDERICK MARGGRAFF AND CHARLES LEISRING, OF WATERBURY, CONNECTICUT.

FARE-REGISTER.

SPECIFICATION forming part of Letters Patent No. 539,816, dated May 28, 1895.

Application filed November 23, 1893. Serial No. 491,714. (No model.)

*To all whom it may concern:*

Be it known that we, FREDERICK MARGGRAFF and CHARLES LEISRING, citizens of the United States, and residents of Waterbury, in the county of New Haven and State of Connecticut, have invented certain new and useful Improvements in Fare-Registers, of which the following is a specification.

Our invention relates to fare registers, and more particularly to that class of registers which are employed for street-car service and intended to be rung up by the conductor in charge of the car at the time of collecting the fares. We are aware that various devices for this purpose have been invented before. A great many of these, however, are impractical and more or less complicated.

It is the object of our present invention, therefore, to produce a fare register for street-car service which shall be simple, durable and inexpensive, and at the same time to produce a register which will be near perfection in its operation, permitting the proper registration of each fare and to prevent any forgery on the part of the operator. In this register we claim to have overcome all possibility for an operator to beat the register in any manner. In a great many registers of this class by the rapid and successive pulls of the strap by the operator, the machine frequently fails to register as often as the bell is rung. In this register we have particularly guarded against any such possibilities and have fully overcome this, together with other minor details which will be fully appreciated through the specification.

Our invention further provides a trip register, together with a total or permanent register, and is provided with a trip indicator upon which may be printed the principal points of destination of the car, for instance, in or out, up or down, or the like.

In order that those skilled in the art to which our invention appertains may fully understand its construction and operation, we will proceed to describe the same in detail, reference being had to the accompanying drawings which form part of this specification, and in which—

Figure 2:
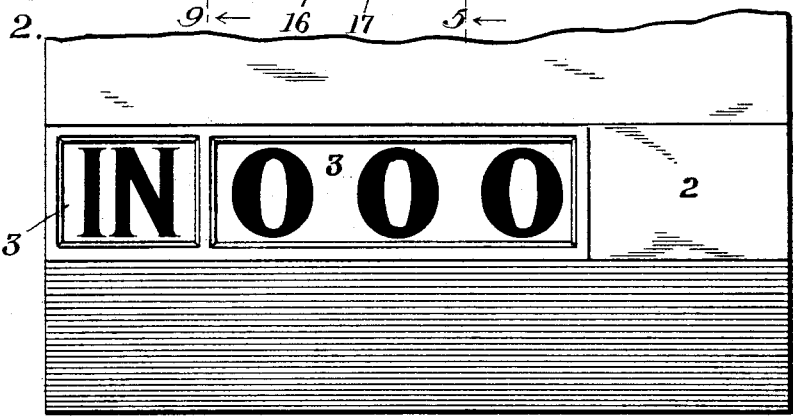
Figure 14:
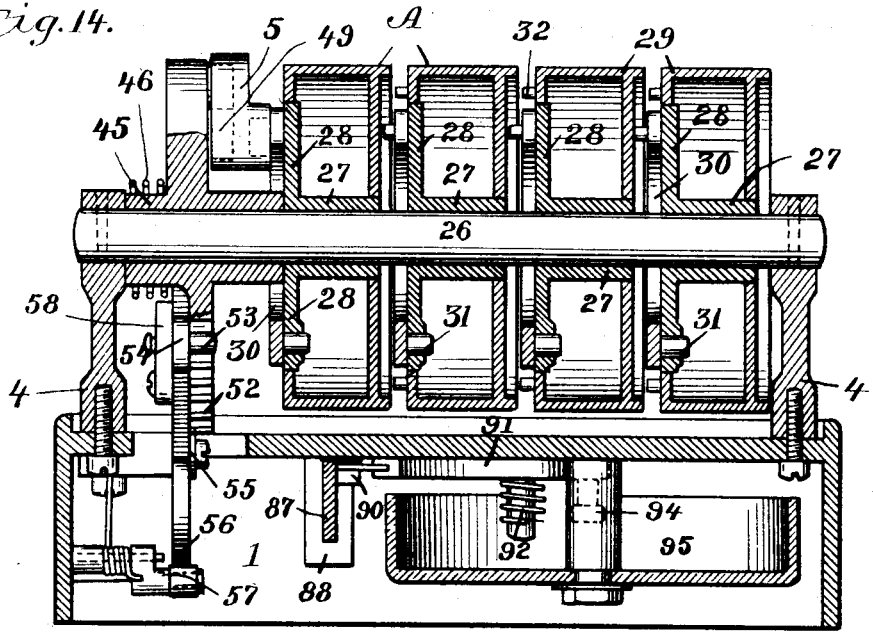
Figure 15:
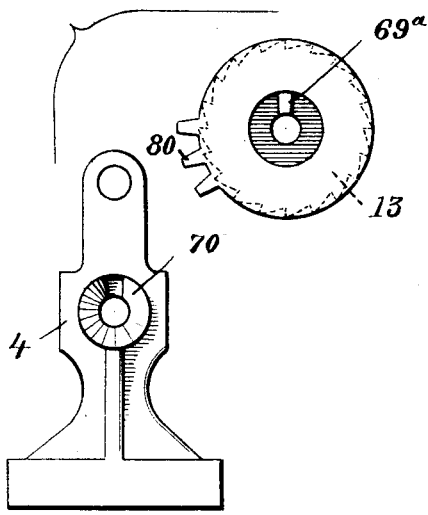
Figure 16:
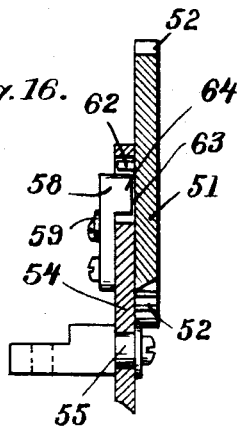
Figure 17:
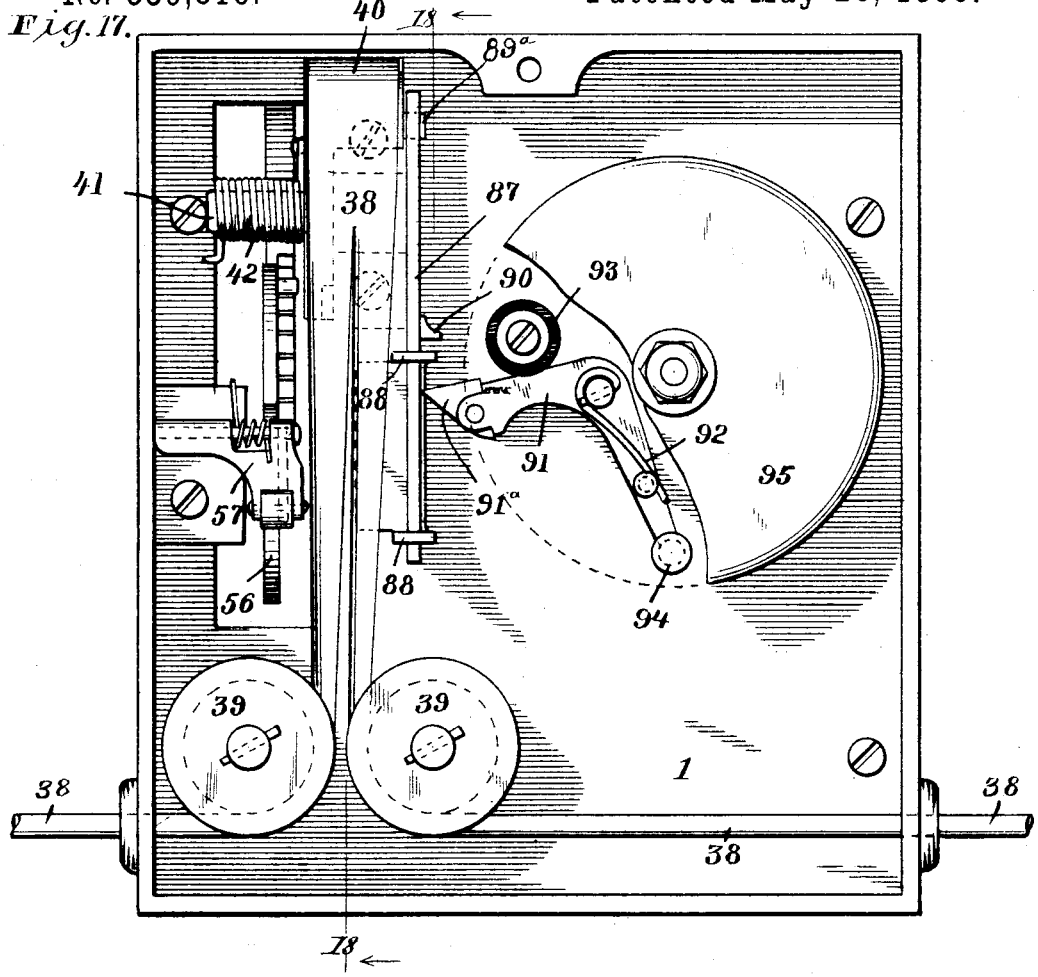
Figure 18:
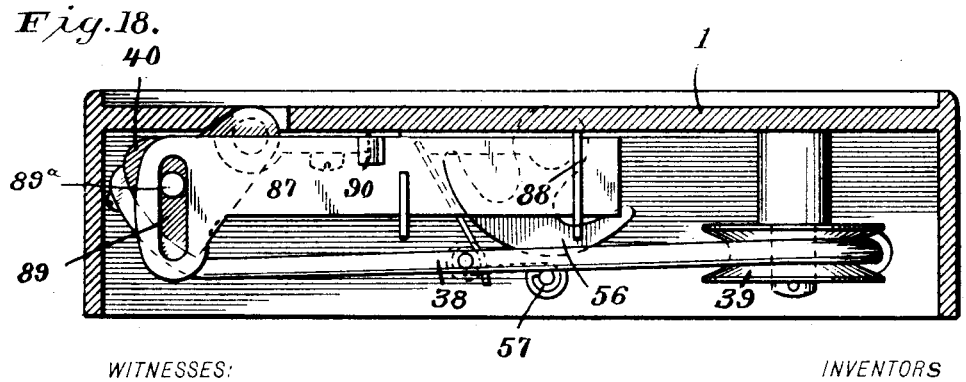

Figure 1 shows a front plan view of our register, the same having its casing or inclosure removed, the machine being in a position ready to be operated. Fig. 2 is a detached view of the lower portion of the casing and showing the trip-register, also the direction-indicator. Fig. 3 shows an end elevation of the register as it would appear from the right of Fig. 1, the position of the parts corresponding therewith and having a portion of the casing removed. Fig. 4 is an end elevation, partly in section, similar in some respects to Fig. 3, the movement of the parts being shown at the opposite extreme from that of Figs. 1 and 3. Fig. 5 is a section on a line 5 5 of Fig. 1. The positions of the U-shaped operating-cams, however, are at the forward extreme of their movement and corresponding with Fig. 4. Fig. 6 shows a sectional elevation of the trip-registering train, together with the mechanism by which said train is turned back to a point of beginning, said section being taken on a line 6 6 of Fig. 1. Fig. 7 shows a left-hand end elevation of the machine and is designed more particularly to illustrate the mechanism by which the direction-indicator is operated. Figs. 8 and 9 relate, also, to the direction-indicator mechanism, Fig. 8 being a detached view of the shaft and illustrating the mechanism for resetting the wheels, Fig. 9 being a sectional elevation on line 9 9 of Fig. 1. Fig. 10 is a section on a line 10 10 of Fig. 1 and shows the manner in which the trip-registering drums are mounted and operated. Fig. 11 shows detached views of one of the units-wheels, the same being respectively in plan, partially sectional, and in side elevation. (See arrow.) Fig. 12 shows an opposite side elevation of the units-wheel illustrated in Fig. 11, having mounted thereon the operating-cam, the position of said cam corresponding with the position of parts of Fig. 1. Fig. 13 shows a detached opposite side elevation of the U-shaped operating-cam. Fig. 14 is a vertical section on a line 14 14 of Fig. 1, looking in the direction of the arrow. Fig. 15 is a detached side elevation of the standard 4 and the ratchet-wheel, showing their cam-surfaces. Fig. 16 is a detail section on a line 16 16 on Fig. 3. Fig. 17 is an inverted plan view of the register, showing the bell and mechanism by which the register is operated and the bell is struck. Fig. 18 is a section of the base of the machine on line 18 18 of Fig. 17, the same relating to the bell mechanism.

In the drawings accompanying and forming part of this specification the same numerals and letters of reference denote the same or like parts throughout the various figures.

1 denotes the base of the machine, which may be of any suitable formation, and 2 denotes a covering or casing having observing glasses 3 through which the numerals upon the registering wheels may be read, also the direction register.

To the base of the machine is secured by means of screws, standards 4 upon which the registering drums are mounted. It will be observed (see Fig. 3) that these standards upon one side are made in one piece, while on the opposite side of the machine they are in two.

A indicates the trip-registering train. We mean by this the register registering the number of fares upon a single trip.

B indicates the total or permanent register.

It is permissible in the operation of this machine, at the end of each trip, if so desired, to turn the trip register to zero without affecting the numbers on the total register. It will be observed, however, that these two registering trains operate together and simultaneously, and in some respects similar to each other at each pull upon the strap 38, the operating pawls of the two registers being connected by a link 5 which clearly appears in Figs. 3 and 4 of the drawings.

Beginning with the trip-registering train A, 6 denotes the units drum or wheel, 7 the tens, and 8 the hundreds drum, it being possible to register upon a single trip nine hundred and ninety-nine fares. These drums are suitably mounted (see Figs. 6 and 10) upon a hollow shaft 9 which is secured to the standards 4 by means of a pin 10. Within said shaft 9 is a solid shaft 11 having upon one end a suitable hand wheel 12 by means of which this train of registering drums are turned back to zero. This shaft, it will be seen, extends the entire length of the machine and is loosely journaled upon the opposite end in bracket 4 and has keyed thereon a ratchet wheel 13, the purpose of which will be later described.

Returning to the drums, it will be seen that, in construction, the several drums are alike, and that each is provided with a smooth periphery upon which the numerals are placed. Each hub of these drums is loosely journaled upon a separate hub 14, said hub being keyed to the before-mentioned hollow shaft 9 so as to rotate with it or allow the shaft to slide in said hubs. The intermediate hubs 14 are provided with a circular flange 15 upon one end, which fits into and finishes even with the side of the registering drum. It is obvious by this construction that the drum is loosely journaled and is free to rotate with the exception of a series of spring-actuated detent pawls 16 (see Fig. 5), which are mounted upon a rod 17. These detent pawls engage pins 18 upon the side of the drums and retain them in a position so that the numerals upon the opposite periphery of said drums will properly register with the observing glass in the case.

Upon the flange 15 of the intermediate hubs 14 is pivoted a U-shaped operating cam 19 carrying a pawl 20ª by means of which the successive drums of higher order are operated. The units drums of each train, however, are operated as before stated, by a link 5 which is in turn connected with an arm 48 of a pivoted hub 45 upon the shaft of the total register. The lower end of said link 5 is operatively connected with pivoted arm 20, see Fig. 1, said arm being provided with a spring-actuated pawl 30ª similar to pawl 20ª of the before-mentioned U-shaped cams 19. The arm 20 and the U-shaped cams are each provided with pins 19ª which loosely fit into holes of the flanges 15 of the hubs of the drums which they operate. The upper end of the link is connected similar to the lower end, and is pivoted to an arm 30 having a pawl 30ª. It will be seen that these arms do not serve as cams, but simply operate upon the pins 18 and 32 upon the units drums. It will be understood, of course, that the pressure brought to bear upon these drums is sufficient to force the pin 18 at the bottom of the drum out of engagement with the before-mentioned detent pawl 16.

The operation of the first drum being explained, we will now describe the relation with the tens drum and also with the hundreds drum. Upon the opposite or right hand face of the units drum (see Figs. 11 and 12) is a stationary pin 21 and also a pin 22 secured to a spring-actuated slide 23 within the drum. The slide is subject to a cross movement within the drum and is provided with a stud 23ª, which extends outwardly through the periphery to be engaged by the L-shaped arm, whereby said drum is reset. These pins 21 and 22 are for the purpose of engaging the U-shaped operating cams 19 in the following manner: In Fig. 12 of the drawings we have indicated by dotted circles the relative positions of these pins 21 and 22 which they would bear upon the adjacent drum at the time when the operating cams 19 are in the position indicated in said figure, it being understood that both of these pins rotate with the movement of the drums on which they are secured, and it will be seen that in such movement they engage the U-shaped operating cam at the proper time and place. For instance, the pin 22 being the farthest from the center of the drum, it engages the outer surface of the cam at a point indicated at 24, (see Fig. 12,) and it is this pin which causes the movement of the adjoining drum. Said pin comes around undisturbed until it strikes the point indicated by 24 of the pivoted U-shaped operating cam 19. The spring-actuated pawl 20ª upon said cam at this instance engages one of the pins 18 upon the drum, forcing the pin and its drum forward one-tenth of its rotation, or one numeral space. At this instant the outward portion of this cam will have neared the center of the drum sufficiently to allow the pin to freely pass around. (See Figs. 4 and 5). The drum upon which pins 21 and 22 are secured continuing in its rotation at the pull upon the strap 38 by the operator, the pin 21 is next brought into play by its engagement with the surface 25 of the operating cams, thus forcing said cam back to its normal position or setting it to engage the next pin 18 upon the drum.

It will be observed that the U-shaped operating cam at the point of contact with the pins 21 and 22 is of a greater diameter than the remaining portion of said cam. The purpose of this is to insure the engagements with the pins. Said pins are just long enough to clear the remaining portions of the cam. It is obvious that from this construction these pins are brought into play at each complete rotation of the drum upon which they are mounted, which means the registration of ten fares or ten numeral spaces.

The operation of the hundreds wheel is identical with that of the tens wheel. The tens wheel operates the hundreds wheel and the units wheel the tens wheel.

Having described the manner in which the trip registering train is operated, we will proceed to describe the operation of the day or permanent registering train or total adder. We have shown this train as consisting of four drums, each of which is rotatably mounted, with ten numerals upon its outer periphery. Of course, any number of these drums could be used, since the mechanism by which the successive ones are operated would simply need to be duplicated. These drums are mounted loosely upon a solid shaft 26 (see Figs. 4 and 5) having its ends fixed to the standards 4, at opposite ends. Upon this shaft is keyed a desired number of hubs 27 having flanges or disks 28. Upon these hubs and disks are secured drums 29 to each of which a U-shaped operating cam 30 is pivoted, as at 31, said cam being provided with a pawl 30ª. It will be seen that these intermediate hubs are in some respects similar to those in the other or trip register train, inasmuch as they are stationary and of the same formation. The same is true of the U-shaped cams, with the exception of its cam surfaces, which it will be seen are materially different. Each of these drums is provided with ten pins 32, which are engaged at each operation by the spring-actuated pawl 30ª upon the pivoted operating cam 30. The drums are detained at proper intervals by the engagement of spring-actuated detent levers 33 with the pins 32 upon the drum. Upon these drums are pins 34 and 35 which serve to operate the operating cams at proper times by their engagement respectively with the cam surfaces 36 and 37 of said operating cam. It will be seen that the manner in which this operating cam is operated is similar to the one upon the trip register, since the pin 34 in its travel throws the U-shaped operating cam back in its movement, while pin 35 throws it forward in its movement. These pins 34 and 35 are fixed to the drums to which they are attached, differing from those of the other train in this respect, inasmuch as the pin 22 of the other train is provided with springs and means by which they permit the train of drums to be turned back to zero.

It will be seen that the connections between the trip-registering train and the total-registering train are such that they operate together—that is to say, each manipulation of the strap 38 causes the units wheel upon both trains to rotate one-tenth of a rotation, and at every complete rotation said units wheel will operate the tens, and in turn a complete rotation of the tens will operate the hundreds.

The total registering train is inclosed within the casing and cannot be turned back by the conductor without removing the case, while the trip registering train is designed to be turned back to zero at the end of each trip.

Referring now to the connections between the drums and the manner in which they are operated, (see Figs. 3, 4, and 17) 38 indicates a suitable operating strap which is divided and passing over suitable grooved rollers 39 mounted upon studs secured to the frame of the machine is led out through round holes at each side of the casing. Said strap then passes up and is connected with a bell-crank lever 40, said lever being pivoted upon a stud 41 and is provided with a helical spring 42 upon said stud, one end of said spring 42 engaging a pin upon the bell-crank lever, the other end engaging a portion of the base of the machine. The purpose of this spring is to force the bell-crank lever to its normal position, as shown in Fig. 3. This spring 42, it will be seen, is one of the mediums by which the operating mechanism is thrown back to its normal position. To one end of the bell-crank lever is pivoted a link 43, the opposite end of said link being pivotally connected to an arm 44 of the hub 45. This hub is loosely pivoted upon the solid shaft 26 and has encircled around it a helical spring 46 (see Fig. 3) one end being attached to an arm of the hub and the other to a pin 47 upon the standard 4. The purpose of this spring is to afford additional motion to throw the opposite parts of the machine back to their normal positions at the ringing of each fare, said spring working in unison with the spring of the bell crank lever. Upon an arm 48 (see Figs. 1 and 4) of this hub 45 is a pin to engage a slot 49 in one end of the link 5. Immediately at the rear of this slot and within the disk 28 is a round hole to receive a stud upon the U-shaped operating cam 30 which operates the units drum of the total registering train. It will be clearly seen from the connection at this point that as the hub 45 upon the shaft 26 rocks in its operation the connections are such that the arm 48 will transmit motion from the hub to the link 5 and from the link to the U-shaped operating cam. The lower end of said link is provided with a suitable opening to fit upon a stud 50 upon the operating arm 20 of the units drum of the trip register. It will be seen from this description that the operation of the registering drums is complete through this train of mechanism. We will therefore next describe the manner in which the machine is prevented from any false operation.

It is necessary in the operation of the machine to pull the strap a sufficient distance to insure the complete operation of the entire machine, and to insure the ringing of the bell at the same moment or an instant before the registering is accomplished. Upon the hub 45 is an extension which we distinguish as 51, having a series of teeth or notches 52 upon the opposite sides, designed to be engaged at proper times by pins 53 upon a pivoted check plate 54, said plate being pivoted upon a screw 55. The lower portion of this plate is provided with a semi-circular extension 56. Upon the surface of the extension we place a suitable tension device 57 which consists of a spring-actuated pivoted arm having a friction roller upon its outer end which engages the surface of the semi-circle 56. See Figs. 14 and 17. Upon the check plate 54 is a pivoted toggle 58, said toggle having attached thereon a spring 59. The purpose of this spring is to engage pins 60 and 61 upon the standards 4, said spring engaging pin 60 when the machine is in the position shown in Fig. 3, and engaging pin 61 when in the position shown in Fig. 4. These pins are shown dotted in Figs. 3 and 4 and also shown in Fig. 1 of the drawings.

Upon the extension 51 is a pin 62, the end of said pin being flush with the face of the check plate and operating within a recess 63 of said check plate. Said pin engages the opposite sides of a projection 64 upon the toggle 58. (See Figs. 3, 4 and 16.) The movement of these parts at the complete operation of the registration of a fare is as follows: The parts of the machine being in the position, as shown in Fig. 3, a pull upon the strap 38 would cause the extension 51 of the hub 45 to descend and the pin 62 would first engage the upper or left hand surface of the projection 64 of the toggle 58. (See Figs. 3 and 16.) Said pin would descend engaging this surface, and would cause said check plate to swing upon its pivot and descend with it until the complete throw of the machine. At this moment the strap would be released and the springs would cause the several parts of the machine to return to their normal position. In so doing the pin 62 upon the extension 51 would engage the under or right hand side of the projection 64 upon the toggles 58 (see Figs. 4 and 16,) and would ride upon said surface until the machine had returned to its normal position, when said toggle would swing back, as shown in Fig. 3 of the drawings. It may be understood from this construction that a partial pull upon the strap would have the effect of causing the pins 53 upon the check plate to engage one of the series of notches upon the extension, thus preventing a partial registration of a fare. The adjustment of the machine is such that anything but a complete pull of the strap will cause the check plate to engage the notches as before stated, and thus prevent the operating drum from rotating and the bell from ringing. The ringing of the bell and the movement of the drum are accomplished at the extreme movement of the machine. Having described this portion of the machine, we will next describe the mechanism by which the trip registering train is reset and also its connection with the line indicator. This will be best understood with reference to Figs. 6, 7, 8, 9, 10, and 11.

As previously stated, the drums of the trip registering train are mounted upon a hollow shaft, which in turn is rotatably mounted upon a solid shaft 11, having upon its end a hand wheel 12 by which the return movement of the drums is accomplished. This hand wheel is designed to be upon the outer side of the casing, so as to be operated by the conductor. Around the shaft 11 is placed a groove 65 which is engaged by a pin 66 of a lever 67, actuated by a helical spring 67$^a$. (See Figs. 3, 4, 6 and 10.) This lever is pivoted at one end to a stud 68, the opposite end being so formed as to engage a lug 69 upon the check plate 54. This lug is of such a length as to insure that it will remain in the path of the lever 67 at all times, excepting when the machine is in its normal position, and by this the machine is prevented from being turned back or reset at any time when it may be standing partially operated. In Fig. 3 it will be seen, as also in Fig. 1, that the drums 6, 7, and 8 could be rotated backward by the manipulation of wheel 12 and its shaft. The opposite end of the shaft 11 has attached thereto a ratchet 13 having a recess within it and a lug 69$^a$ see Fig. 10 within said recess. Said lug is for the purpose of engaging a cam surface 70 upon the standard 4. See Figs. 10 and 15. On the rod 17 is pivoted a spring-actuated pawl 70$^a$ which serves to engage the teeth of the ratchet wheel 13 and thus prevent the shaft 11 from being rotated in but one direction, which is to turn the drums to zero. In order to reset the drums to zero the operator would necessarily have to pull the rod outward against the pressure of the spring 73, which serves to force said ratchet wheel against the cam surface, (see arrow, Fig. 10,) by means of the hand wheel 12, thus disengaging the lug 69$^a$ from the shoulder on the before-mentioned cam 70.

Attached to the shaft 11 (see Fig. 8) is an L-shaped arm 71 extending at a right angle and parallel to said shaft having notches 72 for the purpose of engagement with the stud 23$^a$ of the spring-actuated slide 23 which carries the pin 22. It will be seen that this pin 22 passes through a slot in the drum and is free to be drawn back so as to draw the pin 22 inward and allow the drum to be rotated backward undisturbed.

It will be seen that shaft 11, by means of its hand wheel, is drawn outward against the resistance of a spring 73, and in said movement the arm 71 is carried with it and the notches 72 will engage the studs 23ᵃ of the slide 23 which carries the pins 22 (see Fig. 6) and when in this drawn position by rotating said shaft and its arm 71 said arm will engage the studs 23ᵃ upon the several drums and carry said drums back to zero.

We have provided a small pin 74 upon the periphery of the units and tens drum and which will abut against a spring-actuated plate 75, in order to stop the movement of the drums at zero, as clearly appears in Fig. 6 of the drawings.

Upon the arm 71 is a finger 76 (see Fig. 7) which serves to engage the plate 75 at a point indicated by 77, and by reason of their cam surfaces it will be seen that when the arm 71 is drawn outward and rotated with the shaft the plate 75 will be thrown away from the drums and thereby relieve the pins 23ᵃ, and the drums will again be free to rotate backward. It will be understood, of course, that this plate 75 will in no way interfere with the drums in their registering operation, since the drums will readily slide under the plate, as will also the studs 23, since the arm 71 is cut away in its under side just sufficiently to allow the studs to pass through when the drums rotate in their registering operation. It will be seen that the hundreds drum of the trip register has no pin 23ᵃ. Therefore we have inserted a pin 78 upon one side, which is engaged by a pin 79 upon the arm 71. It will be seen that the connection between the arm 71 and the pin 23ᵃ is such as to engage only while the shaft is drawn outward.

Having thus described the manner in which the trip register is turned to zero, we will next describe its relation with the direction register, which is as follows: Upon the side of the ratchet wheel 13 is the metallic plate having three teeth 80. (See Figs. 6, 8, and 9.) These teeth at each rotation of the shaft in a backward direction will engage leaves of a cage pinion 82 which is journaled in an extension 83 of the standard 4, said pinion having upon one side a single pin 84 which engages a slot of the trip indicator 85, said indicator being journaled upon the shaft 11 and secured in any suitable manner. The cage pinion has upon its periphery notches at opposite sides, which are engaged by a detent spring 86 at the two extreme movements of the trip indicator. It is obvious by this construction and arrangement of parts, that when the shaft, together with its ratchet, &c., is drawn outward a distance sufficient to allow the lug 69 to rest upon the highest point of the cam surface 70, the ratchet wheel, together with its plate may be rotated backward, and during a complete rotation of the same the three teeth 80 will engage the leaves of the cage pinion and rotate it a half rotation, thus throwing the trip indicator 85 forward or backward, as the case may be.

The purpose of the cam surfaces upon the standards 4 and the lug of the recess within the ratchet wheel is that when the shaft is drawn outward and advanced slightly the lug within the recess would be seated upon the highest point of the cam, and as the shaft continues in its rotation said lug would ride down the cam surface until the rotation is completed, when it would again fall into the recess of the cam.

The mechanism by which the bell is operated consists of a slide 87 which is fitted in ways 88 which are secured to the base of the machine. (See Figs. 17 and 18.) Said slide is provided on one end with a slot 89 in which a pin 89ᵃ of the bell-crank lever 40 is designed to operate. Secured upon one side of the slide 87 is a lug 90 for the purpose of engaging a spring actuated pawl 91ᵃ upon a bell crank lever 91 which is mounted upon the base of the machine, one arm being directly in the line of travel of the before-mentioned lug 90. The bell crank lever 91 is provided with a spring 92 by means of which it is held firmly against a rubber cushion stop 93 at all times, except when it is engaged by the lug 90 on the slide. Upon the other end of the bell crank lever is a hammer 94 for the purpose of striking the gong or bell 95. The construction and operation of this device will readily be understood with reference to Figs. 5, 17, and 18 of the drawings. Each pull of the strap a sufficient distance will cause the lug 90 of the slide to draw forward and engage the spring pawl of one end of the bell crank lever 91, and when said slide has been drawn a sufficient distance the bell crank lever will fly back to its normal position, striking its rubber cushion 93 and bell at the same moment. When the strap is released again the slide will also return to its normal position by reason of its connection with the bell crank lever 40 and the helical spring attached thereto.

Having described the construction of the various parts of the machine, we will now briefly describe its operation.

Beginning with the machine and its parts in the position shown in Figs. 1 and 3 of the drawings, a single pull upon the strap will cause the units wheel or drums of both registers to rotate a tenth of a rotation, which will bring into view a higher figure, and when a complete rotation of the units wheel is made by reason of ten operations, said units wheel by its connection previously described will cause the tens wheel to rotate a tenth of a rotation, and at each complete rotation of the tens wheel, the hundreds wheel will operate in a like manner. The movement is communicated to these drums in the following manner: A pull of the strap 38, which is connected to the bell crank lever 40, will cause the lever to swing upon its pivot. This, in turn, being linked to an arm 44 of the pivoted hub 45 will cause said hub to move upon its pivot, carrying with it in said movement the link 5, the U-shaped operating cam of the units wheel of the total registering train and the operating pawl of the units wheel of the trip registering train. It will, of course, be understood that the moment the strap is released, by reason of the springs 42 and 46, the several parts just mentioned will immediately return to their normal position, and they would be in readiness for a second operation, which would be like that of the first, excepting that at each ten operations the adjacent wheels would be operated. In order to return the trip registering train to zero, the operator would first, by means of the handle 12 upon the shaft 11, draw said shaft outward, freeing the engagements of the studs 69 within the ratchet wheel attached to said shaft from the shoulder upon the cam surface 70 of the standard 4. Said shaft 11 would then be rotated in a backward direction, carrying with it its L-shaped arm 71 and the connection of said arm with the stud 23. The drums 6, 7, and 8 would be carried backward with it until the pins 74 of said drums would engage the plate 75. At this instant the lug 60 would again drop into the recess of the cam surface 70. It will be seen that the numerals upon the face of the drums are so placed that when said drums are in the position described the numeral 0 will appear through the observing glass.

Having thus described our invention and its method of operation, we claim—

1. In a fare register of the character described, the combination with the base, having standards and a hollow shaft attached to said standards, of a series of flanged hubs attached to said hollow shaft and each having pivoted thereto a U-shaped operating cam, a series of drums pivoted upon the hubs and having pins 21 and 22 to operate said cams and pins 18 upon said drums by which they are operated by the cam, mechanism as shown for connecting the units drum with the operating strap.

2. In a fare register of the character described, a series of registering drums rotatably mounted upon a series of flanged hubs, said hubs keyed to a hollow shaft, an operating U-shaped cam pivoted to said hubs and designed to be thrown into a forward or backward direction by contact of pins upon the adjacent drum, a spring-actuated pawl upon said U-shaped cam for the purpose of engaging the pins upon the drum mounted upon said hub, together with detent levers by which said drums are detained in their proper position.

3. In a fare register of the character described, the combination with a series of registering drums, mounted upon a hollow shaft, of a solid shaft loosely journaled therein and in standards of the base, an operating wheel upon one end of said shaft and a ratchet wheel upon the other end, said ratchet wheel having a suitable recess upon one side and a lug 69$^a$, a cam surface upon the standards in which said shaft is journaled, a spring between the drums and the ratchet wheel to force the lug of said ratchet wheel against the cam surface, a spring-actuated pawl by which said ratchet wheel is retained against any backward movement, an L-shaped lever attached to said solid shaft, for the purpose of resetting the drums, the whole arranged to operate as shown and for the purpose described.

4. In a fare register, the combination with a series of registering drums having hubs, of a trip registering train of a shaft rotatably mounted within the hubs of said drums and provided with an L-shaped arm extending at a right angle and parallel to said shaft, notches in said arm to engage studs of the spring-actuated pins of the registering drums, a finger upon said arm to engage the cam surface of a spring plate 75 by which the pins 74 of the registering drums are released, the whole constructed so as to allow the free lengthwise movement of said shaft and the backward rotation of the several drums independent of one another, as shown and described.

5. In a fare register, the combination with the trip registering train, of a direction indicator consisting of a cage pinion mounted upon a standard, a pin upon the pinion to engage a slot in the indicator, a ratchet wheel mounted upon a shaft of said train, and having a plate with a series of teeth to engage said cage pinion at each rotation of said shaft, a detent spring attached to the standards to engage notches upon the periphery of said cage pinion, the whole arranged to operate as shown and described.

6. The combination in a car fare register, of the character described, of a shaft having a hand wheel, by means of which the trip registering train is turned to zero, a broken segment to engage a cage pinion, a trip indicator plate pivoted to the standards, having a slot therein to receive a pin of the cage pinion, the whole arranged so as to throw the plate forward or backward at each rotation of the before-mentioned hand wheel.

7. The combination with a series of registering drums of a fare register, of a hub pivoted to the shaft thereof and provided with a pair of arms through which movement is transmitted, an extension 51 upon said hub and having a series of notches upon its face, a locking plate pivoted to the frame of the machine, pins upon the plate to engage the notches of the extension, a spring-actuated toggle attached to said plate, whereby its movement is guided, the whole arranged to check the backward movement of the machine, as described.

8. The combination of the registering drums of a fare register, of a hub connected with the mechanism by which said drums are operated, an extension upon said hub, having a pin upon its side, a series of notches upon its outer surface, a check plate pivoted to the base of the machine, a spring-actuated toggle pivoted to said check plate, a recess to receive a projection of said toggle, pins upon said plate to engage the notches of the extension at such times when the machine is at an intermediate position, a tension device attached to the lower end of said plate, the whole arranged to operate as described.

9. The combination with the trip registering train of a fare register, of a solid shaft journaled within standards of the base, an arm upon said shaft to engage pins upon the drums, whereby said drums are rotated in a backward direction, a groove 69 in the shaft, a spring-actuated lever and pin to connect with said groove, a check plate pivoted to the base, a lug upon the check plate to engage the spring-actuated lever at all times, except when the machine is in its normal position, and thus allowing the free operation of the shaft at said time.

10. In a car fare register, the combination with the total and trip registering train, of stationary hubs suitably mounted upon a shaft, a U-shaped operating cam pivoted upon a flange of said hubs, and provided with operating pawls upon one end and a cam surface upon the other, pins upon the sides of the adjacent drums to engage the cam surfaces of the U-shaped operating cam, pins upon the drums to be engaged by said cams, the mechanism as shown whereby the whole is operated.

Signed at Waterbury, in the county of New Haven and State of Connecticut, this 15th day of November, A. D. 1893.

FREDERICK MARGGRAFF.
    CHAS. LEISRING.

Witnesses:
    C. M. NEWMAN,
    H. F. PECK.